(12) United States Patent
Tsukui et al.

(10) Patent No.: US 6,234,124 B1
(45) Date of Patent: May 22, 2001

(54) INTERNAL COMBUSTION ENGINE WITH VALVE REST MECHANISMS

(75) Inventors: Takaaki Tsukui; Shinichi Nakano, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/433,959

(22) Filed: Nov. 4, 1999

(30) Foreign Application Priority Data

Nov. 4, 1998 (JP) .................................................. 10-312743

(51) Int. Cl.⁷ .............................. F01L 13/00; F01N 3/22

(52) U.S. Cl. ................................. 123/90.15; 123/90.27; 123/308; 123/315; 60/289; 60/304

(58) Field of Search .............................. 123/90.15, 90.16, 123/90.27, 308, 315, 432, 198 F; 60/288, 289, 290, 291, 292, 293, 304

(56) References Cited

U.S. PATENT DOCUMENTS

| | | | |
|---|---|---|---|
| 4,221,197 | * | 9/1980 | Kuroda et al. ........................ 123/316 |
| 4,395,876 | * | 8/1983 | Marsee et al. ......................... 60/284 |
| 5,361,734 | * | 11/1994 | Shirai ................................ 123/90.16 |
| 5,758,612 | * | 6/1998 | Tsuzuku et al. .................. 123/90.16 |
| 5,832,725 | * | 11/1998 | Sim ...................................... 60/289 |

FOREIGN PATENT DOCUMENTS 10-184327   7/1998  (JP) .

\* cited by examiner

*Primary Examiner*—Weilun Lo
(74) *Attorney, Agent, or Firm*—Birch, Stewart, Kolasch & Birch, LLP

(57) ABSTRACT

An internal combustion engine with valve rest mechanisms. Exhaust secondary air is introduced at an exhaust port in a stable manner regardless of the resting, opening and closing operations of exhaust valves. Certain exhaust valves in the internal combustion engine are equipped with valve rest mechanisms. Exhaust valves that are not equipped with valve rest mechanisms located on neighboring cylinders are located on neighboring sides of their respective cylinders.

17 Claims, 2 Drawing Sheets

INTERNAL COMBUSTION ENGINE WITH VALVE REST MECHANISMS

BACKGROUND OF THE INVENTION

1. Field of the Invention

The present invention relates to an internal combustion engine provided with an exhaust secondary air introduction assembly and valve rest mechanisms.

2. Background Art

Guiding of exhaust secondary air into an exhaust path is a well known way of oxidizing unburned components of HC and CO in exhaust gas expelled from a combustion chamber of an internal combustion engine. An air suction-type exhaust secondary introduction assembly employing a reed valve is a well known assembly for introducing exhaust secondary air.

Internal combustion engines exist having valve rest mechanisms for resting the opening and closing operation of some of the inlet valves of a plurality of inlet valves, or resting the opening and closing of some of the exhaust valves of a plurality of exhaust valves, as in Japanese Patent Laid-open Publication No. Hei. 10-184.327. This operation is carried out when the engine is running at a low number of revolutions, or under a low load, so that only a small amount of air is taken in.

There are, however, problems associated with exhaust secondary air introduction assemblies for internal combustion engines having valve rest mechanisms. When one or more of the exhaust valves are stopped, the flow of exhaust gases at the exhaust port is deflected so that exhaust gas is not expelled from the exhaust outlets provided for the exhaust valves that are stopped. It is, however, necessary to maintain a spacing using the position of the exhaust secondary air introduction inlet of the exhaust port for the deflected flow so that there is sufficient mixing of the exhaust gas and the exhaust secondary air by the time the exhaust gas reaches an exhaust purification assembly.

The air suction-type exhaust secondary air introduction assembly also has to ensure, with the position of the exhaust secondary air introduction opening of the exhaust port, that the pulsation pressure of the exhaust gas operates on the exhaust secondary air introduction opening when one or more exhaust valves are stopped.

SUMMARY OF THE INVENTION

In order to overcome the aforementioned disadvantages, the present invention provides an internal combustion engine with valve rest mechanisms where exhaust secondary air is brought to an exhaust port so as to be introduced in a stable manner, regardless of the resting and opening and closing operation of one or more exhaust valves. This is done by ensuring that the amount of exhaust secondary air required for purification is introduced at the exhaust port when one or more exhaust valves are stopped.

In addition to the above, the present invention provides an internal combustion engine with a valve rest mechanism and a plurality of cylinders in which the structure for introducing exhaust secondary air is compact.

An internal combustion engine is provided with valve rest mechanisms for resting a valve opening and closing operation of some of a plurality of exhaust valves provided per cylinder in response to a running state of the engine. The exhaust secondary air introduction opening is provided at an exhaust port in the vicinity of exhaust valves not equipped with valve rest mechanisms.

Exhaust secondary air introduction openings are provided at an exhaust port in the vicinity of exhaust valves that constantly open and close and which are not equipped with valve rest mechanisms. An amount of exhaust secondary air necessary for air purification can therefore be introduced even when the exhaust valves equipped with the valve rest mechanisms are stopped. Exhaust secondary air can be introduced at the exhaust port in a stable manner regardless of the resting and opening and closing operation of some of the exhaust valves. The rate of purification of exhaust gas occurring at an exhaust purification assembly is therefore increased.

The internal combustion engine has a plurality of cylinders and valve rest mechanisms for resting a valve opening and closing operation of some of a plurality of exhaust valves provided per cylinder. The resting is done in response to the running state of the engine. Exhaust valves not equipped with valve rest mechanisms are provided at exhaust outlets on neighboring sides of neighboring pairs of cylinders, and an exhaust secondary air introduction opening is provided at an exhaust port in the vicinity of exhaust valves not equipped with valve rest mechanisms.

Exhaust valves not equipped with valve rest mechanisms are provided at mutually neighboring exhaust openings at neighboring pairs of cylinders, and an exhaust secondary air introduction opening is provided at the exhaust port in the vicinity of these exhaust valves. The exhaust secondary air can therefore be introduced in a stable manner to the exhaust port. The purification rate for the exhaust gas occurring in the exhaust purification is improved. Also, the points at which the exhaust secondary air paths reach the exhaust secondary air introduction opening connect together and can be arranged collectively, resulting in a more compact structure.

A pair of housings for housing valves for controlling an amount of air introduced at each exhaust secondary air introduction opening are provided which are connected at an upper surface of a cylinder head cover. A single reed valve cap covers the pair of housings, so that it is not necessary to mount separate reed valve caps on the respective housings. The number of assembly steps and parts can be therefore reduced.

One or more of a plurality of exhaust valves provided for each pair of cylinders are equipped with valve rest mechanisms for resting the opening and closing of valves according to the running state of the engine. Exhaust valves equipped with valve rest mechanisms are provided at inlets on neighboring sides of pairs of cylinders. Therefore, when the internal combustion engine runs at low speed or with a low load so that the intake valves equipped with valve rest mechanisms and the exhaust valves are stopped, air that flows in from just the inlets provided at the intake valves that are not provided with valve rest mechanisms forms a vortex current (for example, a swirl) within the ignition chamber. Combustibility is therefore improved and improvements in fuel consumption and emissions are obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
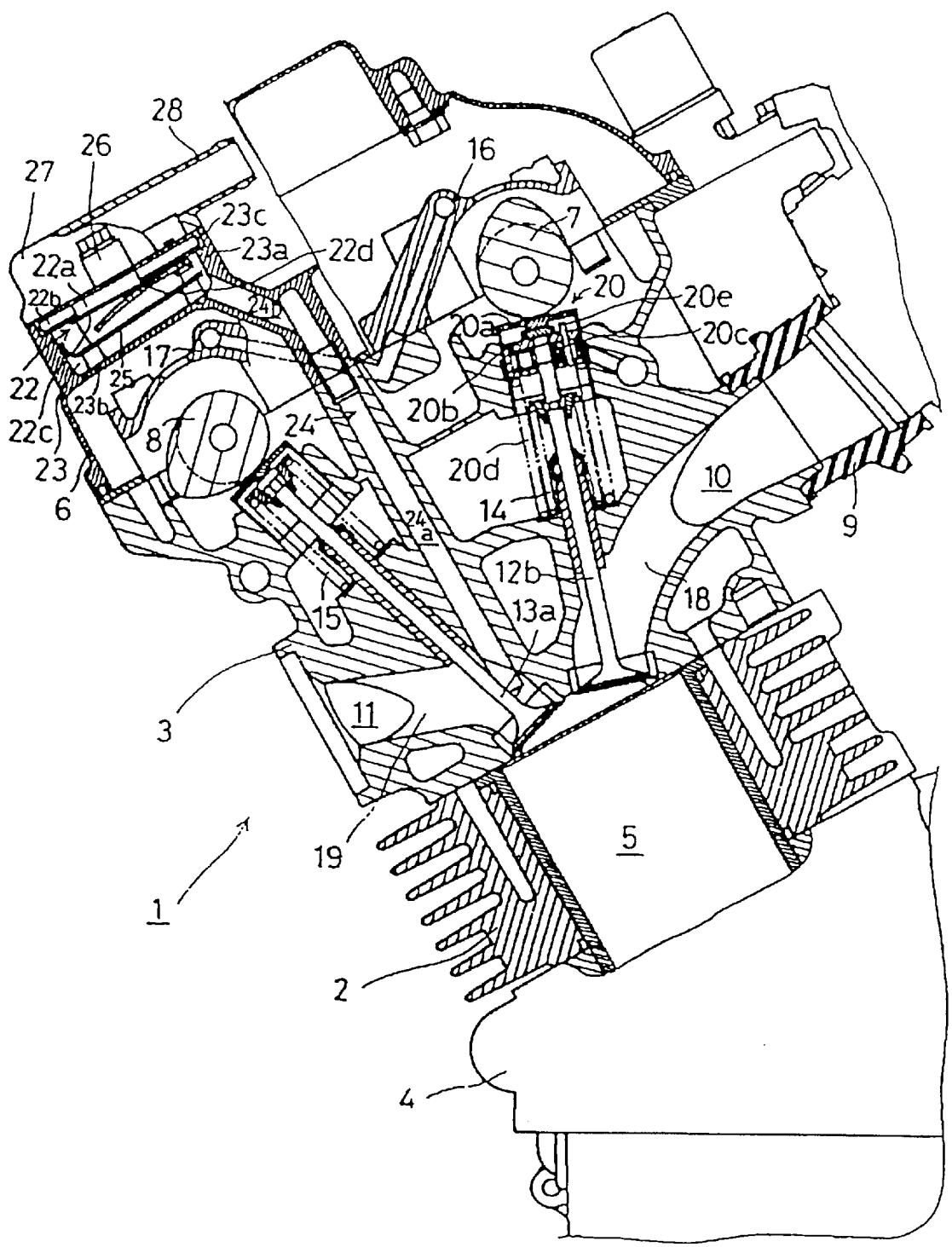
FIG. 1 is a vertical cross-sectional view of an internal combustion engine according to the present invention.

FIG. 1 is a cross-sectional view of an internal combustion engine 1 having a valve rest mechanism 20 according to the present invention. The engine 1 includes a cylinder head 3, a camshaft, a cylinder head cover 6 and an intake connection pipe 9. The cross-section for the intake/exhaust port and the intake/exhaust valves, and the cross-section of the exhaust secondary air introduction assembly are in different planes.

The internal combustion engine 1 is a series four cylinder/four stroke cycle internal combustion engine. The cylinder axis of a cylinder block 2 is inclined from the front to the rear of the vehicle with respect to a crankshaft, which is oriented transversely across the vehicle. A cylinder head 3 is located on the upper side of the cylinder block 2, and a crankcase 4 is located on the lower side of the cylinder block 2.

An intake port 10 and an exhaust port 11 communicate via two independent inlets and two independent exhaust outlets at a combustion chamber 5. Combustion chamber 5 consists of the cylinder block 2, cylinder head 3, and a piston (not shown). Mushroom-shaped intake valves 12a and 12b, and mushroom-shaped exhaust valves 13a and 13b are supported at one of their ends by retainers attached to the valve axis. The other ends are urged in a direction to close inlets and exhaust outlets by valve springs 14 and 15. Valve springs 14 and 15 are supported at the cylinder head 3. An oilway is formed at an intake cam cap 16 and the exhaust cam cap 17 in order to supply lubricating oil to an intake camshaft 7 and an exhaust camshaft 8.

At each cylinder, the inlet ports 10 comprising single openings at the rear end surfaces of the cylinder head 3 are partitioned by bulkheads 18, forming independent branched intake ports. Each branched intake port communicates with a corresponding inlet. A carburetor is mounted via an intake connection pipe 9 at the rear end of the intake port 10.

At each cylinder, the exhaust ports 11 comprising single openings at the front end surfaces of the cylinder head 3 are partitioned by bulkheads 19 forming independent branched exhaust ports, with each branched exhaust port communicating with a corresponding exhaust outlet. The exhaust ports 11 are connected to an exhaust pipe manifold.

Figure 2:
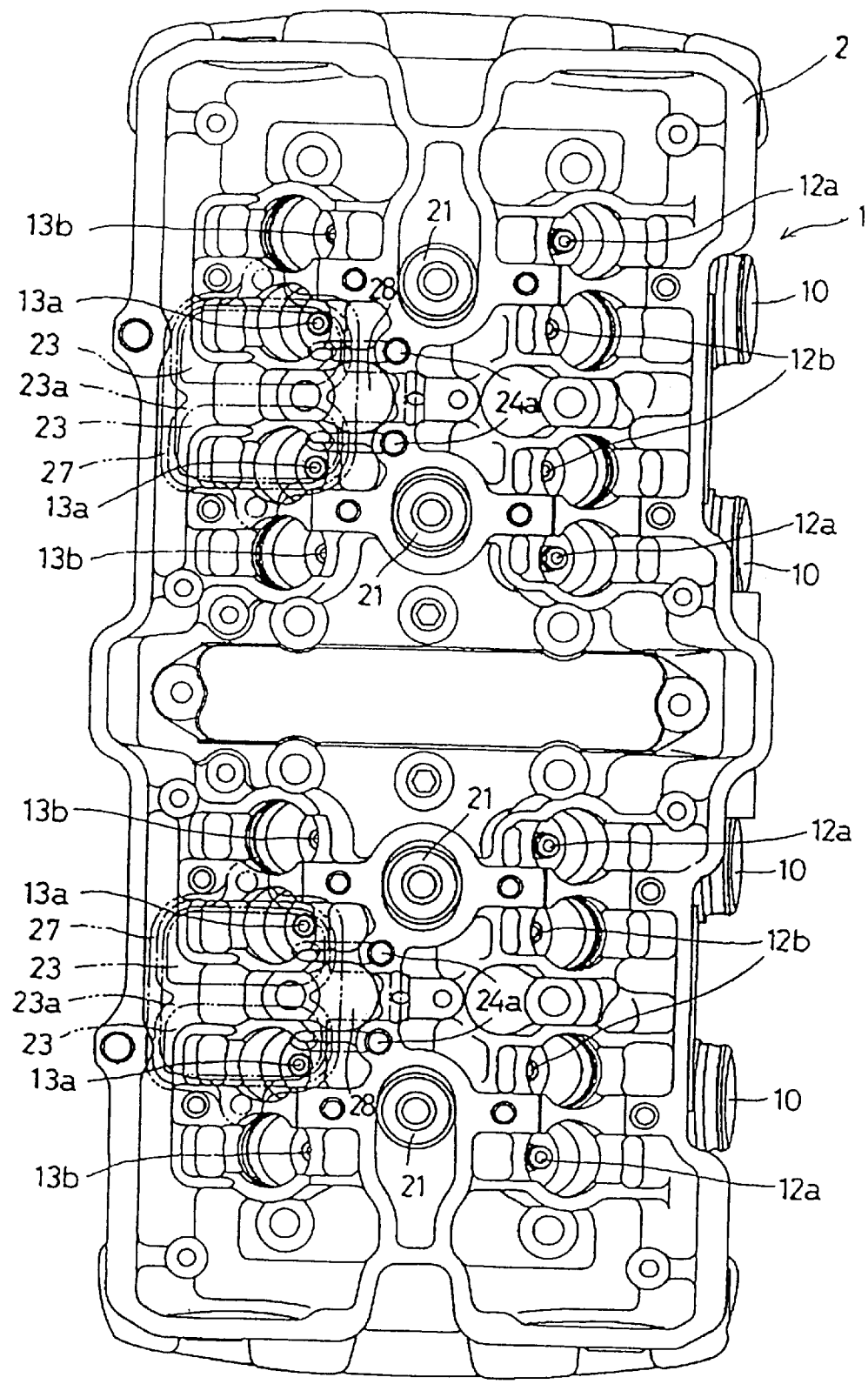
FIG. 2 is a plan view of an internal combustion engine according to the present invention.

FIG. 2 is a plan view of a four cylinder internal combustion engine according to the present invention. Each cylinder has two intake valves 12a and 12b and two exhaust valves 13a and 13b. Each intake valve 12b and each exhaust valve 13b is equipped with a valve rest mechanism 20. The four cylinders are arranged in a linearly symmetrical manner with respect to a central line running from the front to the rear of the vehicle. The intake port 10 and the exhaust valves 12a and 12b are positioned at the rear side of the vehicle with respect to a plane including the cylinder axes of each of the four cylinders. The exhaust port 11 and the exhaust valves 13a and 13b are positioned at the front side of the vehicle with respect to this plane.

With regards to the pair of cylinders on the right side facing towards the front of the vehicle, the intake valves 12b, 12b provided at the inlets on the sides where the cylinders neighbor each other are equipped with valve rest mechanisms 20. However, the exhaust valves 12a and 12a provided at the inlets at the sides where the cylinders do not neighbor each other are not equipped with valve rest mechanisms 20. Therefore, regarding the first pair of cylinders, the exhaust valves 13a, 13a at the neighboring sides of the cylinders are not equipped with valve rest mechanisms 20, but the exhaust valves 13b, 13b on the sides of the cylinders that do not neighbor each other are equipped with the valve rest mechanisms 20. The arrangement of the valve rest mechanisms 20 relating to the intake valves 12a and 12b and the exhaust valves 13a and 13b is the same as the relation of the pair of cylinders on the left side of the vehicle. For a single cylinder, the valves equipped with the valve rest mechanisms 20 and the valves not equipped with the valve rest mechanisms 20 are symmetrically arranged with respect to a spark plug 21 of this chamber.

The intake valve 12a and the exhaust valve 13a which are not equipped with valve rest mechanisms 20 are constantly operated so as to be opened and closed by the intake cam 7 and the exhaust cam 8 while the engine is running.

The valve rest mechanism 20 has the same structure as the valve rest mechanism disclosed in Japanese Patent Laid-open Publication No. Hei. 10-184327.

The valve rest mechanism 20 comprises an intake lifter 20a, a plunger holder 20b capable of sliding within the intake lifter 20a, a plunger 20c, a lifter spring 20d for urging the intake lifter 20a in a direction away from the valve axis, and a hydraulically actuated oil pressure supply mechanism for resisting the bias of the plunger spring at the plunger 20c. A cylinder hole is formed within the plunger holder 20b orthogonal to the valve axis of the intake valve 12b. The plunger 20c slides within the cylinder hole. A slide hole is located at the plunger holder 20b which is orthogonal to the cylinder hole. In this way, the head part of the valve axis of the intake valve 12b can be moved in so as to pass through the slide hole.

A run-off hole is formed slightly to the left of center at the plunger 20c so that the head part of the valve axis of the exhaust valve 12b can enter and pass. A U-shaped channel is formed at the right end part. When the plunger 20c is slid to the right by the urging of the plunger spring, the bottom of the U-shaped channel comes into contact with a pin 20e. The pin 20e is provided so as to penetrate the plunger holder 20b in the direction of the valve axis. When in contact, the run-off hole and the slide hole formed in the plunger holder 20b are made to coincide so that the head part of the valve axis can enter these holes.

When the plunger 20 receives hydraulic pressure so as to resist the urging force of the plunger spring and to move to the left in FIG. 1, the run-off hole and the slide hole do not coincide and the head part of the valve axis cannot enter these holes.

When the valve is blocked, the plunger 20c is urged by the plunger spring and is made to slide to the right in FIG. 1, so as to come into contact with the pin 20e. In this way, the run-off hole and the slide hole coincide, and when the intake lifter 20a moves downwards within the exhaust lifter guide hole formed in the cylinder head 3 in unison with the rotation of the intake camshaft 7, the head part of the valve axis enters these holes. At this time, transmission of force between the intake lifter 20a and the valve axis is interrupted, and the exhaust valve 12b is held in a closed state.

When the resting state of the valve is released, the plunger 20c is made to slide to the left in FIG. 1. This is due to hydraulic pressure, and the run-off hole and the slide hole will no longer coincide, and the head part of the valve axis comes into contact with the plunger 20c so that the exhaust valve 12b opens and closes in unison with the rotation of the intake camshaft 7.

The exhaust secondary air introduction assembly includes a reed valve assembly 22, a housing 23, an exhaust secondary air introduction path 24, a diaphragm 25, a reed valve cap 27, and an air intake pipe 28. The reed valve assembly 22 is attached within the housing 23 above the exhaust valve 13a of the cylinder head cover 6 that is not equipped with a valve rest mechanism 20. The housing 23 has a rectangular surrounding wall 23a. When viewed from above, the angular sections are in the shape of an "R." The surrounding wall 23a and a bottom wall 23b of the housing 23 are integrally formed with the cylinder head cover 6.

The bottom wall 23b is inclined downwards away from the cylinder axis with respect to a plane of alignment of the cylinder head 3 and the cylinder head cover 6. The exhaust secondary air introduction path 24 opens at the highest part of the bottom wall 23b at the housing 23. Watertightness can be improved for the exhaust secondary air introduction path 24 by adapting the position of the openings at the inclined bottom wall 23b and the housing 23 of the exhaust secondary air introduction path 24.

The diaphragm 25 is provided at the housing 23 between a rest 22d of the reed valve assembly 22 and the bottom wall 23b. The diaphragm 25 is attached to a support undercarriage extending upwards from the bottom wall 23b, and curves upwards along the surrounding wall 23a. A gap is provided so that air can flow between the side end and rear end of the diaphragm 25 and the surrounding wall 23a. Air that is taken in collides with the diaphragm 25 and is guided to the opening of the exhaust secondary air introduction path 24 of the housing 23. The diaphragm 25 prevents the reed valve assembly 22 from being directly exposed to high temperature, high pressure exhaust gas.

The reed valve assembly 22 comprises a valve sheet body 22b formed with a ventilation hole 22a for air taken in from an air intake pipe 28. The reed valve assembly 22 also includes a flexible plate-shaped reed valve 22c which is actuated by the pressure of exhaust gas coming from the exhaust secondary air introduction path 24, so as to open and close the ventilation hole 22a. A bow-shaped rest 22d faces the reed valve 22c for limiting deviation of the reed valve 22c. In this embodiment, the reed valve assembly 22 controls the amount of secondary exhaust air entering at the branched intake port of the exhaust port 11. The valve sheet body 22b fits into a stepped part 23c at the open end of the surrounding wall 23a. An edge of the valve sheet body 22b on the stepped part 23c can be fixed by the reed valve cap 27 fixed to the cylinder head cover 6 by a bolt 26. The reed valve 22c is fixed to the valve sheet body 22b by the rest 22d and a bolt 26.

In the above configuration, the reed valve assembly 22 and the housing 23 are provided for each cylinder. However, the positioning of the housing 23 and the reed valve cap 27 shown by the virtual lines in FIG. 2 can also be adopted with respect to pairs of neighboring cylinders. Namely, with a pair of neighboring cylinders, the surrounding wall 23a for the housing 23 of one cylinder and the surrounding wall 23a on the side near the other cylinder are integrally formed with the surrounding wall 23a of the housing 23 for the other cylinder and the surrounding wall 23a on the side near the other cylinder. This pair of housings 23, 23 thus share a common surrounding wall 23a. The single reed valve cap 27 having air intake pipe 28 for taking air into the housing 23 is mounted at the opens ends of the pair of housings 23, 23. The pair of housings 23, 23 are covered from above. The reed valve cap 27 is fixed to the cylinder head cover 6 by the bolt 26 at positions at both ends along the direction of the row of cylinders.

The air intake pipe 28 is integrally formed with the reed valve cap 27 so as to extend between the spark plugs 21 at the pair of neighboring cylinders. The air intake pipe 28 is configured as a common air intake means for a pair of reed valve assemblies 22. Therefore, when air is taken in from an air cleaner of the internal combustion engine 1 via an air supply connection pipe, it is sufficient to connect a single air supply connection pipe to the open end of the air intake pipe 28, and air supply connection pipes do not have to be connected to each reed valve assembly. The number of air supply connection pipes can therefore be reduced and the air supply connection piping can be made compact.

As shown in FIG. 1, the exhaust secondary air introduction path 24 provided at each cylinder of the internal combustion engine 1 comprises a first path 24a formed so as to penetrate the cylinder head 3, and a second path 24b formed so as to penetrate the cylinder head cover 6. The first path 24a is formed in a straight line substantially parallel to the cylinder axis at a position towards the neighboring cylinder, from the valve axis insertion position of the exhaust valve 13a between the valve insertion position of the exhaust valve 13a that is not equipped with a valve rest mechanism 20, and the cylinder axis.

The first path 24a opens in the vicinity of the exhaust valve 13a of the branched exhaust port of the exhaust port 11, where the exhaust valve 13a that is not equipped with a valve rest mechanism 20 is provided. This opening position is set at a position where the amount of secondary exhaust air required for purification of the exhaust gas can be obtained, taking into consideration the magnitude of the pressure due to pulsations of exhaust gas generated around the exhaust valve 13a of the branched exhaust port, the flow characteristics of the reed valve assembly 22, and the path resistance of the exhaust secondary air introduction path 24, etc.

The second path 24b communicates with the first path 24a in a plane where an end of the second path 24b is aligned with the cylinder head 3 and the cylinder head cover 6 and the other end opens at the highest position of the bottom wall 23b of the housing 23. The central axes of the first path 24a and the second path 24b are coplanar and in a plane parallel with a plane orthogonal to the axis of the crankshaft.

As shown in FIG. 2, regarding exhaust secondary air introduction paths 24 formed at neighboring pairs of cylinders, the exhaust secondary air introduction path 24 for one of the cylinders is positioned close to the other cylinder so as to be positioned on both sides of the air intake pipe 28 when viewed from above.

The operation of the engine will now be described for operation when the internal combustion engine 1 runs at low speed or with a low load so that the valves are stopped, i.e., so that the valve rest mechanisms 20 are operating. An air mixture that flows in from only the inlets provided at the intake valves 12a that are not provided with valve rest mechanisms 20 and are constantly opening and closing forms a vortex current (for example, a swirl) within the ignition chamber 5. Exhaust gas from the ignition chamber 5 is expelled via only the branched exhaust ports of the exhaust ports 11 provided at the exhaust valves 13a that are not provided with valve rest mechanisms 20 that constantly open and close.

At this time, exhaust gas pulsation pressure is generated at the branched exhaust ports of the exhaust port 11 provided with the exhaust valves 13a that are not equipped with the valve rest mechanisms 20. The pressure is generated as a result of exhaust gas sinking at the branched exhaust port of the exhaust port 11 provided with exhaust valves 13b equipped with valve rest mechanisms. This pulsation pressure then acts upon the reed valve 22c via the exhaust secondary air introduction path 24.

When the pressure of the exhaust gas becomes negative so that the reed valve 22c opens, air flowing from the air intake pipe 28 flows through the ventilation hole 22a of the valve sheet body 22b, passes through the exhaust secondary air introduction path 24, and enters the branched exhaust port of the exhaust port 11 of the exhaust valves 13a that are not provided with the valve rest mechanism 20. The air is then mixed with the exhaust gas, and flows to a downstream exhaust purification assembly.

The valve rest mechanisms 20 do not operate when the engine is operating at high speed or under a high load. An air mixture sufficient for obtaining a high output flows into the combustion chamber 5 from the inlets provided at the exhaust valves 12a that are not equipped with valve rest mechanisms 20, and from the inlets provided at the intake valves 12b that constantly open and close that are equipped with valve rest mechanisms 20. Exhaust gas from the combustion chamber 5 is then discharged not only from the branched exhaust port of the exhaust port 11 provided with the exhaust valves 13a that are not equipped with valve rest mechanism 20, but also from the branched exhaust port of the exhaust port 11 provided with the exhaust valves 13b that are equipped with the valve rest mechanisms 20.

The introduction of the exhaust secondary air is also carried out at this time in response to the pulsation pressure of the exhaust gas of the branched exhaust port of the exhaust port 11 provided with the exhaust valves 13a that are not equipped with the valve rest mechanisms 20. That is, the reed valve assembly 22 is actuated based on the pulsation pressure of the exhaust gas of the branched exhaust port of the exhaust port 11 provided with the exhaust valves 13a that are not equipped with the valve rest mechanisms 20. The secondary air is introduced to the branched exhaust port of the exhaust port 11 via the exhaust secondary air introduction path 24, and then flows into an exhaust purification assembly mixed together with exhaust.

Many advantageous results are realized by the present invention. The exhaust secondary air introduction path 24 opens at the branched exhaust port of the exhaust port 11 provided with exhaust valves 13a not equipped with valve rest mechanisms 20. An amount of exhaust secondary air necessary for air purification can therefore be introduced even when the exhaust valves equipped with the valve rest mechanisms are stopped. Exhaust secondary air can therefore be introduced at the exhaust port in a stable manner regardless of the resting and opening and closing operation of some of the exhaust valves. The rate of purification of exhaust gas occurring at an exhaust purification assembly is therefore improved.

Further, at neighboring pairs of cylinders of the internal combustion engine 1 having a plurality of cylinders, the exhaust valves 13a that are not equipped with valve rest mechanisms 20 are provided at exhaust openings on mutually neighboring sides, and the exhaust secondary air introduction path 24 is made to open at the branched exhaust port of the exhaust port 11. The points at which the exhaust secondary air paths reaching the exhaust secondary air introduction opening connect together can be arranged collectively.

At neighboring pairs of cylinders, a pair of mutually connecting housings 23, 23 housing reed valve assemblies 22, 22 corresponding to the cylinders are provided at the cylinder head cover 6. A single reed valve cap 27 covering the pair of reed valve assemblies 22, 22 is then mounted for the pair of housings 23, 23. It is therefore not necessary to mount separate reed valve caps 27 for each of the housings 23, 23.

Further, the air intake pipe 28 provided at the reed valve cap 27 is common to the pair of reed valve assemblies 22. When air is taken in via the air supply connection pipe 28, it is sufficient to connect one air supply connection pipe to the open end of the air intake pipe 28. The number of air supply connection pipes can therefore be reduced because it is not necessary to connect a separate air supply connection pipe to each reed valve assembly.

The intake valves 12b equipped with valve rest mechanisms 20 are provided at inlet openings on the mutually near sides of neighboring pairs of cylinders so as to face the exhaust openings where the exhaust valves 13a that are not equipped with valve rest mechanisms are provided. Therefore, when the engine 1 runs with the valve rest mechanisms 20 operating, an air mixture only flows into the ignition chamber 5 from inlets provided at the intake valves 12a that are always opening and closing, and are not equipped with valve rest mechanism 20, A vortex flow (for example, a swirl) is thus formed within the ignition chamber. Combustibility is improved and improvements in fuel consumption and emissions are obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
   a crankcase; and
   a cylinder including:
      a first exhaust valve having a valve rest mechanism;
      a second exhaust valve which opens and closes without substantial interruption while the engine is running;
      an intake port for supplying air to the cylinder;
      an exhaust port for exhausting combustion gases from the cylinder; and
      an exhaust secondary air introduction opening; wherein the exhaust secondary air introduction opening opens into the exhaust port at a location which is closer to the second exhaust valve than to the first exhaust valve.

2. The internal combustion engine of claim 1, wherein the valve rest mechanism interrupts the opening and closing of the first exhaust valve in response to a running state of the engine.

3. The internal combustion engine of claim 1, wherein the cylinder further includes:
   a valve assembly, the valve assembly being responsive to the running state of the engine to allow air to flow from the exhaust secondary air introduction opening to the exhaust port.

4. The internal combustion engine of claim 3, wherein the valve assembly includes a reed valve.

5. The internal combustion engine of claim 1, wherein the cylinder further includes:
   a first intake valve having a valve rest mechanism; and
   a second intake valve which opens and closes without substantial interruption while the engine is running.

6. The internal combustion engine of claim 5, wherein the crankcase has a longitudinal axis, the first and second intake valves being located on one side of the longitudinal axis, and the first and second exhaust valves being located on another side of the longitudinal axis, the first intake valve being closer to the second exhaust valve than to the first exhaust valve.

7. The internal combustion engine of claim 6, wherein a plane transverse to the longitudinal axis of the crankcase lies between the first and second exhaust valves, and between the first and second intake valves, the first exhaust valve and the second intake valve being on the same side of the plane.

8. An internal combustion engine comprising:
   a first cylinder including:
      a first exhaust valve having a valve rest mechanism; and
      a second exhaust valve which opens and closes without substantial interruption while the engine is running;
   a second cylinder including:
      a first exhaust valve having a valve rest mechanism; and
      a second exhaust valve which opens and closes without substantial interruption while the engine is running; and
   a crankcase; wherein
      the second exhaust valve of the first cylinder is closer to the second exhaust valve of the second cylinder than to the first exhaust valve of the second cylinder.

9. The internal combustion engine of claim 8, wherein the valve rest mechanisms interrupt the opening and closing of exhaust valves in response to a running state of the engine.

10. The internal combustion engine of claim 8, wherein the crankcase has a longitudinal axis, the exhaust valves being located on one side of the longitudinal axis, and the intake valves being located on another side of the longitudinal axis, and, a plane transverse to the longitudinal axis lies between the first and second cylinders.

11. The internal combustion engine of claim 10, wherein each cylinder further includes:
   an exhaust port for exhausting combustion gases; and
   an exhaust secondary air introduction opening which opens into a respective exhaust port.

12. The internal combustion engine of claim 11, wherein each cylinder further includes a valve assembly which is responsive to the running state of the engine to allow air to flow from the exhaust secondary air introduction openings to a respective exhaust port.

13. The internal combustion engine of claim 12, wherein each valve assembly includes a housing, with a single cap covering both housings.

14. The internal combustion engine of claim 12, further comprising:
   an air intake pipe, the air intake pipe supplying air to the valve assemblies of both the first and second cylinder.

15. The internal combustion engine of claim 8, wherein each cylinder includes:
   a first intake valve having a valve rest mechanism; and
   a second intake valve which opens and closes without substantial interruption while the engine is running.

16. The internal combustion engine of claim 15, wherein the first intake of the first cylinder is closer to the first intake valve of the second cylinder than to the second intake valve of the second cylinder.

17. The internal combustion engine of claim 10, further comprising:
   a third cylinder; and
   a fourth cylinder; wherein
      the four cylinders are disposed essentially in a line along the longitudinal axis of the crankcase.

\* \* \* \* \*